April 14, 1936.     T. LORD     2,037,032
MOUNTING
Filed Oct. 30, 1933

INVENTOR.
Thomas Lord
BY
ATTORNEYS.

Patented Apr. 14, 1936

2,037,032

UNITED STATES PATENT OFFICE 2,037,032

MOUNTING

Thomas Lord, Erie, Pa., assignor to Hugh C. Lord, Erie, Pa.

Application October 30, 1933, Serial No. 695,806

14 Claims. (Cl. 248—358)

Mountings have heretofore been provided utilizing rubber, which rubber has been so arranged as to project into free space from a supporting wall so as to support its load through the shear action of the rubber and thus more sensitively insulate the supported and supporting parts. Usually these structures have been provided with a supporting wall of metal to which the rubber has been secured by bonding, in this way getting the full shear value of the rubber. The principal object of the present invention is to cheapen this product by forming the yielding part of the rubber integrally with a wall of rubber, or similar material, of sufficient mass, or non-yielding quality as to give to the projecting rubber a proper backing, or support, to permit it to yield in shear and to give to the rubber full shear value and also to assure uniformity in performance. Features and details of the invention will appear from the specification and claims.

A preferred embodiment of the invention is illustrated in the accompanying drawing as follows:—

Figure 1:
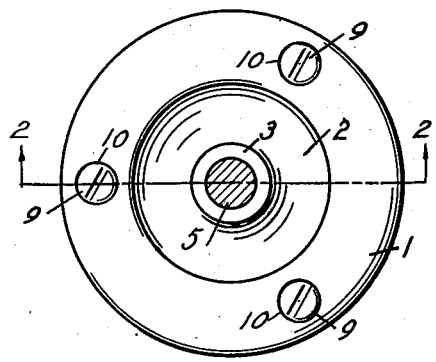

Fig. 1 shows a plan view of a mounting.

Figure 2:
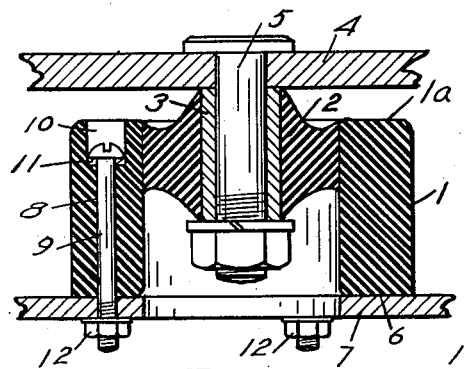

Fig. 2 a section of the line 2—2 in Fig. 1.

Figure 3:
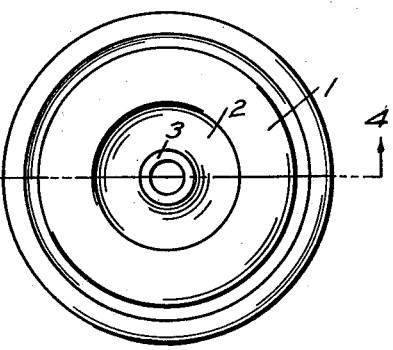

Fig. 3 a plan view of a modification.

Figure 4:
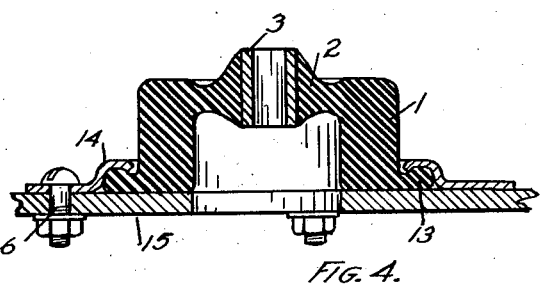

Fig. 4 a section on the line 4—4 in Fig. 3.

Figure 5:
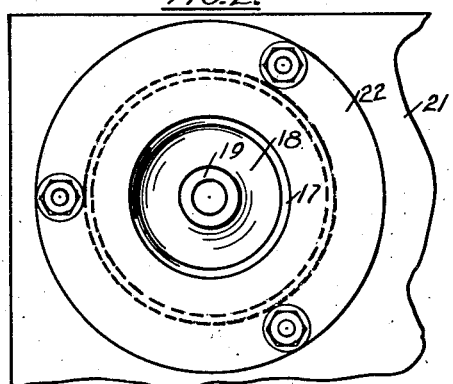

Fig. 5 a plan view of a further modification.

Figure 6:
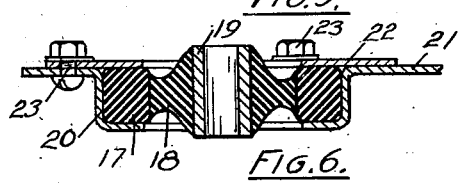

Fig. 6 a section of the same.

In the structure shown in Figs. 1 and 2, 1 marks the wall of the mounting, and 2 the yielding, or flexible element. This is formed integrally with the wall 1, the wall 1 being of sufficient mass, as compared to the yielding portion, or being formed of so much less yielding quality, as to assure a proper and comparatively non-yielding support in carrying the load. A metal tube 3 is preferably secured to the rubber of the element 2 at the center and the load 4 has a pin 5 which extends into the tube and is thus secured. The base surface 6 of the mounting is off-set from the flexible rubber element and rests on a suitable supporting base 7. The lower part of the movable element is sufficiently elevated by the cup shape of the mounting as a whole to permit of the proper movement of the yielding part within the recess formed within the wall. The walls 1 have axially extending perforations 8 and screws 9 extend through these perforations, the head being preferably sunk in a socket 10 and operating against a washer 11. The screws are secured by nuts 12 below the plate 7. The rubber of the wall 1 may be, and preferably is, of a quality that will resist an abnormal movement of the load through direct engagement with the load and thus the upper surface 1a of the wall projects sufficiently to engage the load on an abnormal movement of the flexible element.

In the modification shown in Figs. 3 and 4 there are the same walls 1, flexible element 2, and central member 3, but there is added a flange 13 at the base and a ring 14 engages the base and is secured to the supporting plate 15 by screws 16. The operation of this mounting is substantially the same as that shown in Figs. 1 and 2.

In the modification shown in Figs. 5 and 6, the walls 17 are centrally located with relation to the flexible structure 18, the flexible part of the mounting being similar to that shown in Fig. 1 and provided with a central tubular member 19. The walls 17 are dropped into sockets 20 in a supporting plate 21 and secured therein by a cover plate 22, the cover plate being secured to the supporting plate by screws 23. Ordinarily the rubber of the entire mounting is fabricated and molded in one operation even though the rubber for the wall may be formed of a compound forming much less yieldable rubber than the supporting element. In other words, the rubber mass may be made sufficient so that it is comparatively non-yieldable under normal load by reason of the softness and comparatively smaller mass as it is subjected to the shear action in the rubber element. Rubber in shear in itself is very much softer than rubber subjected to direct stress and this condition adds to the possibility of the rubber wall functioning where sufficient mass is supplied with relation to the rubber element.

The rubber wall in these structures being of plastic material formed integrally with the yieldable cushion element, ordinarily of rubber, makes possible a mounting of very high quality at a minimum of expense. The wall is of a size and character with relation to the capacity of the load carrying, or cushion, element to be capable of accommodating without exterior metal backing or substantial deformation the load capacity of the element. In many environments, metal such as steel is objectionable by reason of its corrosion, and therefore this mounting of plastic material, particularly the exposed wall, is of particular advantage in this respect. In some environments, also, where sound transmission is a factor, a difference in the quality of the rubber forming the insulation adds to the efficiency of the mounting, as some qualities are more efficient for certain tones than others, and this can be well accomplished with a variation of the wall and the cushion in forming the wall of a quality more suitable for sustaining the load without material distortion, and forming the cushion so as to give it the proper period, or softness, for the load for which it is designed.

What I claim as new is:

1. In a mounting, a side supporting wall of rubber comparatively undeformable under normal load; a rubber load carrying element projecting angularly from the side wall into free space in shear relation to the side wall, said load carrying element being integral with the side wall and of less thickness in the direction of shear than the side wall and comparatively relatively yieldable in a shear direction, said wall through its comparative rigidity sustaining the shear thrust of the projecting element; and perforations extending in a shear direction through said wall.

2. In a mounting, a side supporting wall of rubber comparatively undeformable under normal load; and a rubber load carrying element projecting angularly from the side wall into free space in shear relation to the side wall, said load carrying element being integral with the side wall and of less thickness in the direction of shear than the side wall and comparatively relatively yieldable in a shear direction, said wall through its comparative rigidity sustaining the shear thrust of the projecting element, said wall having an integral flange about its base.

3. In a mounting, opposing supporting side wall portions of rubber, comparatively undeformable under normal load; and load carrying member portions of rubber projecting angularly from the wall portions into free space between said portions and in shear relation thereto, said rubber member portions being comparatively yieldable with relation to said wall and integral therewith, said wall portions having perforations extending therethrough in the direction of shear.

4. In a mounting, opposing supporting side wall portions of rubber, comparatively undeformable under normal load; load carrying member portions of rubber projecting angularly from the wall portions into free space between said portions and in shear relation thereto, said rubber member portions being comparatively yieldable with relation to said wall and integral therewith; and a rubber flange formed integrally with the wall and extending along the base.

5. In a mounting, a plastic supporting side wall and a rubber yieldable load carrying element formed integrally, said element projecting angularly from the side wall into free space, and in shear load carrying relation to the wall, the supporting wall being so proportioned as to size and character of material with relation to the load carrying element as to be capable of accommodating without exterior metal backing or substantial deformation the load capacity of the element.

6. In a mounting, a hard rubber supporting side wall and a rubber yieldable load carrying element formed integrally, said element projecting angularly from the side wall into free space, and in shear load carrying relation to the wall, the supporting wall being so proportioned as to size and character of material with relation to the load carrying element as to be capable of accommodating without exterior metal backing or substantial deformation the load capacity of the element.

7. In a mounting, a plastic supporting side wall and a rubber load carrying element formed integrally, said element projecting angularly from the side wall into free space, and in shear load carrying relation to the wall, said element being thinner in the shear direction than the supporting wall, and the supporting wall being so proportioned as to size and character of material with relation to the load carrying element as to be capable of accommodating without exterior metal backing or substantial deformation the load capacity of the element.

8. In a mounting, a plastic supporting side wall and a rubber yieldable element formed integrally, said element projecting angularly from the said wall into free space and in shear load carrying relation to the wall, a hard element carried by the rubber element and arranged in spaced relation with the wall and in shear relation with the rubber element, the supporting wall being so proportioned as to size and character of material with relation to the yieldable element as to be capable of accommodating without exterior metal backing or substantial deformation the load capacity of the element.

9. In a mounting, opposing plastic supporting side wall portions and a rubber yieldable load carrying element formed integrally, said element projecting angularly from the side wall portions into free space and in shear load carrying relation to the side wall portions, the side wall portions being so proportioned as to size and character of material with relation to the load carrying element as to be capable of accommodating without exterior metal backing or substantial deformation the load capacity of the element.

10. In a mounting, opposing plastic supporting side wall portions and a rubber yieldable load carrying element formed integrally, said element projecting angularly from the side wall portions into free space and in shear load carrying relation to the side wall portions, said element being offset in a shear direction from one of the edges of each supporting side wall portion, and the side wall portions being so proportioned as to size and character of material with relation to the load carrying element as to be capable of accommodating without exterior metal backing or substantial deformation the load capacity of the element.

11. In a mounting, a plastic supporting annular side wall and a rubber yieldable load carrying element formed integrally, said element projecting angularly from the side wall into free space within the projected area of the side wall and in shear load carrying relation to the wall, the supporting wall being so proportioned as to size and character of material with relation to the load carrying element as to be capable of accommodating without exterior metal backing or substantial deformation the load capacity of the element.

12. In a mounting, an annular hard rubber supporting side wall and a rubber yieldable load carrying element formed integrally, said element projecting angularly from the side wall into free space within the projected area of the side wall and in shear load carrying relation to the wall, the supporting wall being so proportioned as to size and character of material with relation to the load carrying element as to be capable of accommodating without exterior metal backing or substantial deformation the load capacity of the element.

13. In a joint, the combination of a side wall and a rubber yieldable element subjected to the load thrust on the joint formed integrally, said element projecting angularly from the side wall into free space, the side wall being so proportioned as to size and character of material with relation to the yieldable element as to be capable of accommodating without exterior metal backing or substantial deformation the load capacity of the element.

14. In a joint, a plastic annular side wall; and a rubber yieldable element subjected to the load thrust on the joint formed integrally, said element projecting angularly from the side wall into free space within the projected area of the side wall, the side wall being so proportioned as to size and character of material with relation to the yieldable element as to be capable of accommodating without exterior metal backing, or substantial deformation the load capacity of the element.

THOMAS LORD.